W. M. STEVENSON.
ANTISLIP DEVICE.
APPLICATION FILED FEB. 7, 1908.

923,456.

Patented June 1, 1909.
2 SHEETS—SHEET 1.

WITNESSES
A. C. Fairbanks
J. M. Sterns

INVENTOR
William M. Stevenson
BY
Webster & Co.,
ATTORNEYS

W. M. STEVENSON.
ANTISLIP DEVICE.
APPLICATION FILED FEB. 7, 1908.

923,456.

Patented June 1, 1909.
2 SHEETS—SHEET 2.

WITNESSES
A. C. Fairbanks.
J. M. Sterns.

INVENTOR
William M. Stevenson,
BY
Webster & Co.,
ATTORNEYS

UNITED STATES PATENT OFFICE.

WILLIAM M. STEVENSON, OF INDIAN ORCHARD, MASSACHUSETTS.

ANTISLIP DEVICE.

No. 923,456.    Specification of Letters Patent.    Patented June 1, 1909.

Application filed February 7, 1908. Serial No. 414,759.

*To all whom it may concern:*

Be it known that I, WILLIAM M. STEVENSON, a citizen of the United States of America, residing at Indian Orchard, in the county of Hampden and State of Massachusetts, have invented a new and useful Antislip Device, of which the following is a specification.

My invention relates to improvements in devices designed to be attached to the tires of power-driven road-vehicle wheels to cause such wheels to "track" firmly and evenly and to prevent them from sliding, slipping or skidding, and consists of an arch with a comparatively soft tread which is either curved or straight longitudinally and has scalloped, indented or serrated edges and may be perforated, all as hereinafter set forth.

Heretofore anti-slip devices of various kinds have been produced which were made of metal in some form with the result that, however much or little value they may possess as gripping mediums, they tear up and wear out the roads to such an extent that their use has been prohibited even, in some localities; furthermore, such devices seriously injure the tires; and the primary object of my invention is to produce a tire-grip which, while possessing practically all of the advantages of metallic devices for a similar purpose, do not destroy or even seriously injure the road-bed, and do not injure the tire.

A further object is to provide a device of this kind which is capable of being secured firmly to a tire, and one which can be so attached readily and as readily detached from the tire.

I attain these objects by the means illustrated in the accompanying drawings, in which—

Figure 1:
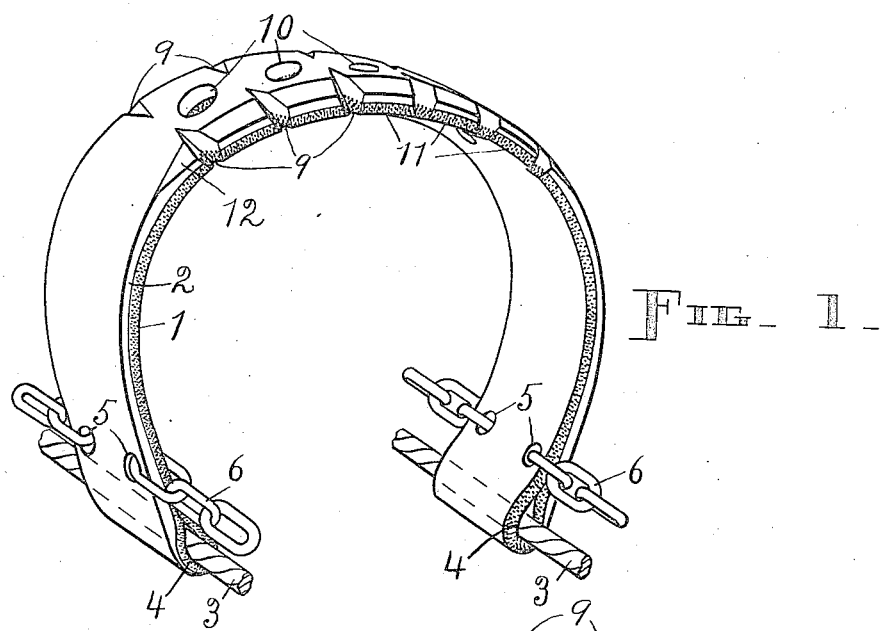
Figure 2:
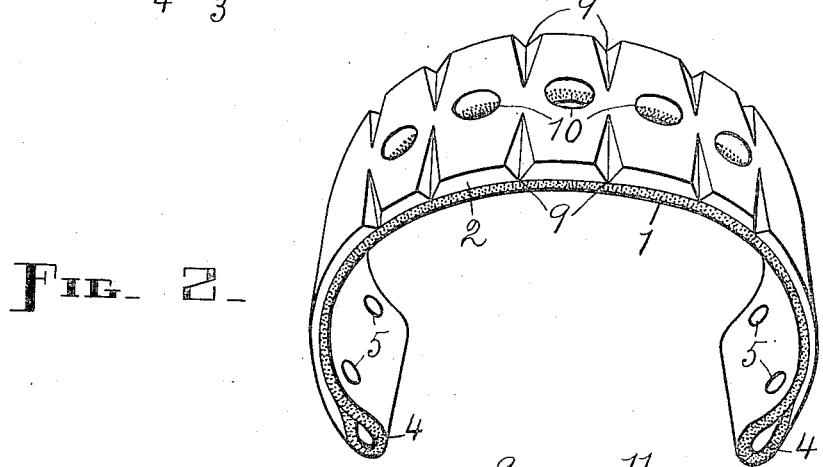
Figure 3:
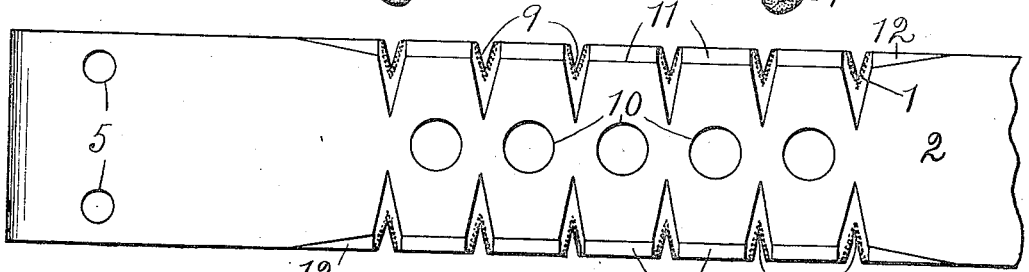
Figure 4:
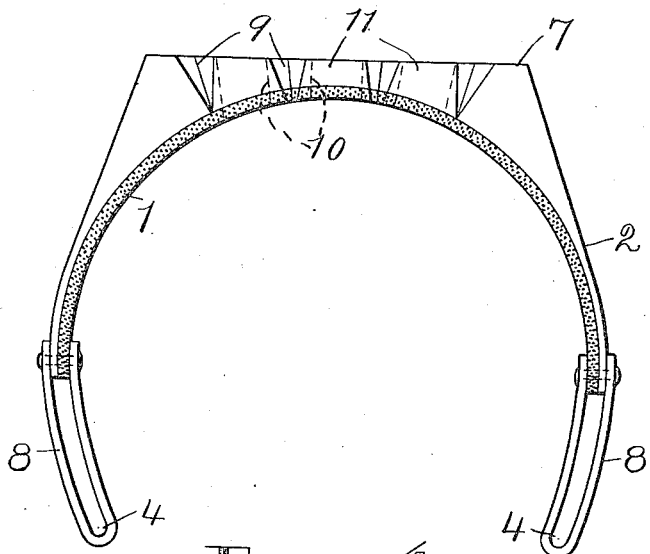
Figure 5:
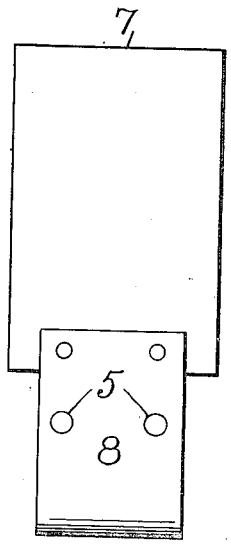
Figure 6:
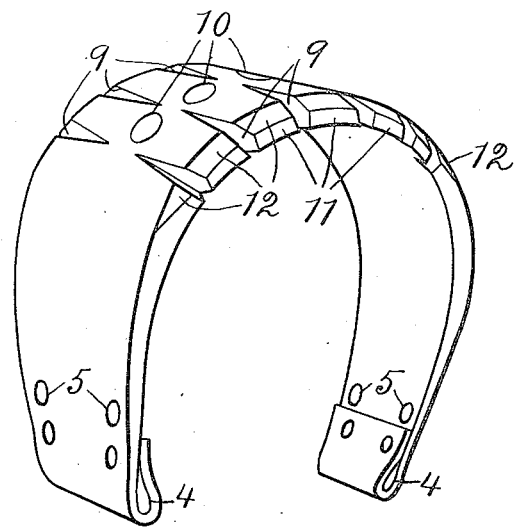

Figure 1 is a perspective view of one form of my invention; Fig. 2, a perspective view of a slightly modified form of said invention; Fig. 3, a plan view of the grip shown in the first view as it would appear if flattened, one end being removed; Fig. 4, an edge view of a grip having a straight tread longitudinally; Fig. 5, a side view of the grip shown in the preceding view, and, Fig. 6, a perspective view of a one-piece grip.

Similar figures refer to similar parts throughout the several views.

The form of my grip shown in the first three views comprises in its inception a strip 1 of frictioned fabric for a backing and a strip 2 of rubber for a facing, the two strips being united and formed into an arch of the horseshoe variety the tread portion of which is generally thicker than the side portions. This arch is so proportioned that it is adapted to fit over the tire on a wheel and to be secured thereto in any suitable manner, as by means of cables 3—3 passing through openings 4—4 in the ends or legs of said arch, and turn-buckles (not shown), the cables extending around the wheel on both sides in the usual manner. Two openings 5 are provided in each leg of said arch, at right-angles to and outside of the opening 4 therein, to receive chains 6 by means of which the arches are spaced apart, it being understood, of course, that a plurality of arches is used with each wheel. In the absence of some suitable spacing means as the chains 6, or in the event that the arches were fastened in place with straps passed inside of the wheel rim in the well-known manner, as might be done, the arches would be liable to "creep". Owing to the shape of the grip or arch and to the length of the sides thereof it will embrace more than half of that portion of the tire to which it is applied, or, to state it differently, the circumference of either of the cables 3 is less than that of a tire, to which a set of grips is fastened by said cables, at the center, so that it is possible to attach the grip to the tire in a very firm and secure manner. This soft grip, that is, soft in comparison to metallic grips, has been found to afford a very satisfactory antislip device, even without the additional features described below.

In Figs. 4 and 5 the outer or tread portion of the grip is represented at 7 as being built out so as to produce a straight tread longitudinally, which will be crosswise of the tire to which such grip is applied, which is of much advantage because of the larger trackage surface, the angles at the ends of such surface as well as at the sides, and the greater wearing qualities. This straight tread 7 may be longer or shorter as desired. In these views there are shown, also, leather tabs 8—8 in place of the combined rubber and fabric for the lower terminals of the legs of the arch, which are to be used as fastening or attaching mediums. These tabs are secured to the terminals of the combined rubber and fabric portion by means of rivets or in any other suitable manner to complete the arch. A saving in rubber is effected by employing the tabs at the ends in the manner just explained, hence there is a saving in expense.

Similar tabs may be employed to advantage in connection with the grips illustrated in Figs. 1 and 2.

Generally speaking the more exposed angles, sharp edges, or corners there are in a device of this kind, provided they are not so numerous as to weaken the device, the better the device will grip the road-bed, therefore I prefer to provide my arch or the tread thereof with additional angular portions besides those naturally afforded along both longitudinal or lateral edges of the two styles of treads shown and at the ends also of the straight tread 7. Such additional gripping portions are secured either by cutting into the lateral edges of the tread of the arch, or by perforating such tread, or both. The shape, number and size of the cut portions and of the perforations will vary necessarily in order to meet different conditions or requirements, but V-shaped notches 9 in the edges of the rubber facing 2, which may or may not extend through the edges of the fabric backing 1, and substantially round holes 10 through the center of the tread in the spaces marked off by each set of four of such notches, are believed to be well adapted for the purpose. The notches 9 are V-shaped longitudinally and in cross-section, and such notches in Figs. 1 and 3 and the two middle ones in Fig. 4 in part extend through the backing 1, while said notches in Fig. 2 and the two outer ones in Fig. 4 are formed in the facing 2 only and do not extend into said backing. The outer portions of the ends of the parts or tongues 11 of a grip between the notches 9, and of the parts of such grip which are adjacent to the end notches, may be chamfered in any case, as shown at 12 in Figs. 1 and 3, or not, as seems best. The device which appears in the last view is similar to that shown in the first view excepting that it is a one-piece grip made of leather or other suitable material instead of being constructed out of fabric and rubber. The notches 9 in the leather or one-piece grip may be like those in the Fig. 2 grip just as well.

The tabs 8 on the "straight-tread" grip and the ends of the one-piece grip are represented as being narrower than the intermediate portions of the two grips, while each of the other grips is of the same width throughout, but it is to be understood that this matter of width is unimportant so far as my invention is concerned, and that in some cases the grips herein shown as being of the same width throughout will be made like those herein shown which vary in width, and vice versa.

As will appear evident from the foregoing, I do not wish to be restricted to any specific construction so far as size, shape and minor details are concerned.

What I claim as my invention, and desire to secure by Letters Patent, is—

1. A comparatively soft or yielding grip, of the class described, consisting of an arch adapted to fit over a tire and having a tread with serrated edges, said tread having a plain portion between the edge serrations which is continuous.

2. A comparatively soft or yielding grip, of the class described, consisting of an arch adapted to fit over a tire and having a tread with serrated and chamfered edges, said tread having a plain portion between said serrated and chamfered edges which is continuous.

3. A comparatively soft or yielding grip, of the class described, consisting of an arch adapted to fit over a tire and having a perforated tread with serrated edges, said tread having a plain portion between said serrated edges and around the perforations in the tread which is continuous.

4. A comparatively soft or yielding grip, of the class described, consisting of an arch adapted to fit over a tire and having a perforated tread with serrated and chamfered edges, said tread having a plain portion between said serrated and chamfered edges and around the perforations in the tread which is continuous.

WILLIAM M. STEVENSON.

Witnesses:
   ALFRED C. FAIRBANKS,
   F. A. CUTTER.